Feb. 18, 1947.     H. J. BICHSEL     2,416,144
CONTROL CIRCUIT
Filed Aug. 15, 1944     2 Sheets-Sheet 1

WITNESSES:

INVENTOR
Harry J. Bichsel.
BY
ATTORNEY

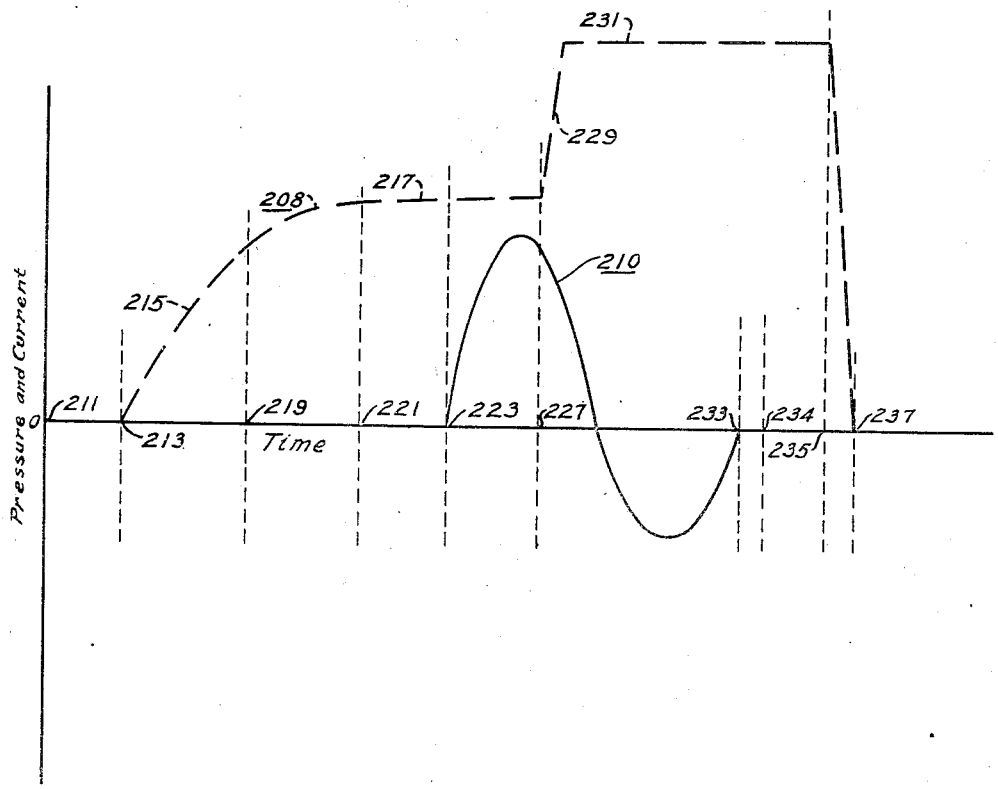

Patented Feb. 18, 1947

2,416,144

UNITED STATES PATENT OFFICE 2,416,144

CONTROL CIRCUIT

Harry J. Bichsel, Forest Hills, Pa., assignor to Westinghouse Electric Corporation, East Pittsburgh, Pa., a corporation of Pennsylvania Application August 15, 1944, Serial No. 549,566

3 Claims. (Cl. 219—4)

This invention relates to an electronic control circuit and has particular relation to the control of resistance welding operations.

In connection with a resistance welding operation, it is generally believed that the application of an additional pressure to the material being welded at some time after initiation of the flow of welding current but during the welding period, results in an improved weld. This process involving the supplying of the additional pressure is known as forging.

Forging appears to be particularly important in the difficult operation of spot welding materials having a narrow plastic range and high thermal conductivity, such as aluminum. While generally satisfactory welds may be made with such materials using a system known as capacitor discharge resistance welding which provides a pulse of accurately measured welding current, many welding engineers agree that forging can be instrumental in producing improved crack-free welds.

In most welding machines now on the market a fluid pressure system is associated with the welding electrodes whereby the material to be welded is clamped between the electrodes with a predetermined pressure. Forging may be accomplished with such an arrangement by operating a solenoid valve in the pressure system to increase the pressure rapidly by a given amount at a particular instant during the period in which welding current flows. However, considerable difficulty has been encountered in attempting to operate the solenoid valve at the right instant.

It has been found that the instant of application of the additional forging pressure in welding materials up to .125 of an inch thick should be adjustable from .008 to .192 of a second after the initiation of the welding current, the duration of the welding current, of course, also being adjustable for materials of different thicknesses. Investigations also indicate that the instant of application of the pressure should not vary from that desired by more than plus or minus .0016 of a second.

These time periods and the permissible error are exceedingly small when the nature of the operation is considered. It has been discovered that there is an appreciable time delay between the instant of energization of the coil of the solenoid valve and the opening of the valve to permit the application of an increased pressure. With many valves the time delay is greater than the time permissible, at a minimum setting, between the initiation of the flow of welding current and the application of the increased pressure. For this reason it becomes necessary to energize the coil of the solenoid valve in some cases before the initiation of the flow of welding current and in other cases after the initiation of the flow of welding current. Moreover, since simultaneous operation of two contactors on a single relay of the standard designs cannot be obtained with any degree of regularity, the use of such relays in directly controlling the two operations must be avoided.

It is, accordingly, an object of my invention to provide new and improved control apparatus for resistance welding.

Another object of my invention is to provide an extremely accurate timing system for use in effecting two different operations.

A further object of my invention is to provide resistance welding apparatus with a control system whereby an accurately timed forging operation may be obtained.

A more specific object of my invention is to provide an extremely accurate control system for use in initiating the flow of welding current in a resistance welding machine and thereafter initiating the application of an increased pressure on the material to be welded at a preselected instant during the flow of welding current.

Other objects of my invention will become apparent upon reading the following description of a specific embodiment of my invention in connection with the accompanying drawings, in which:

Fig. 2 is a graph illustrating the relationship with respect to time between various operations of the circuit of Fig. 1.

Figure 1:
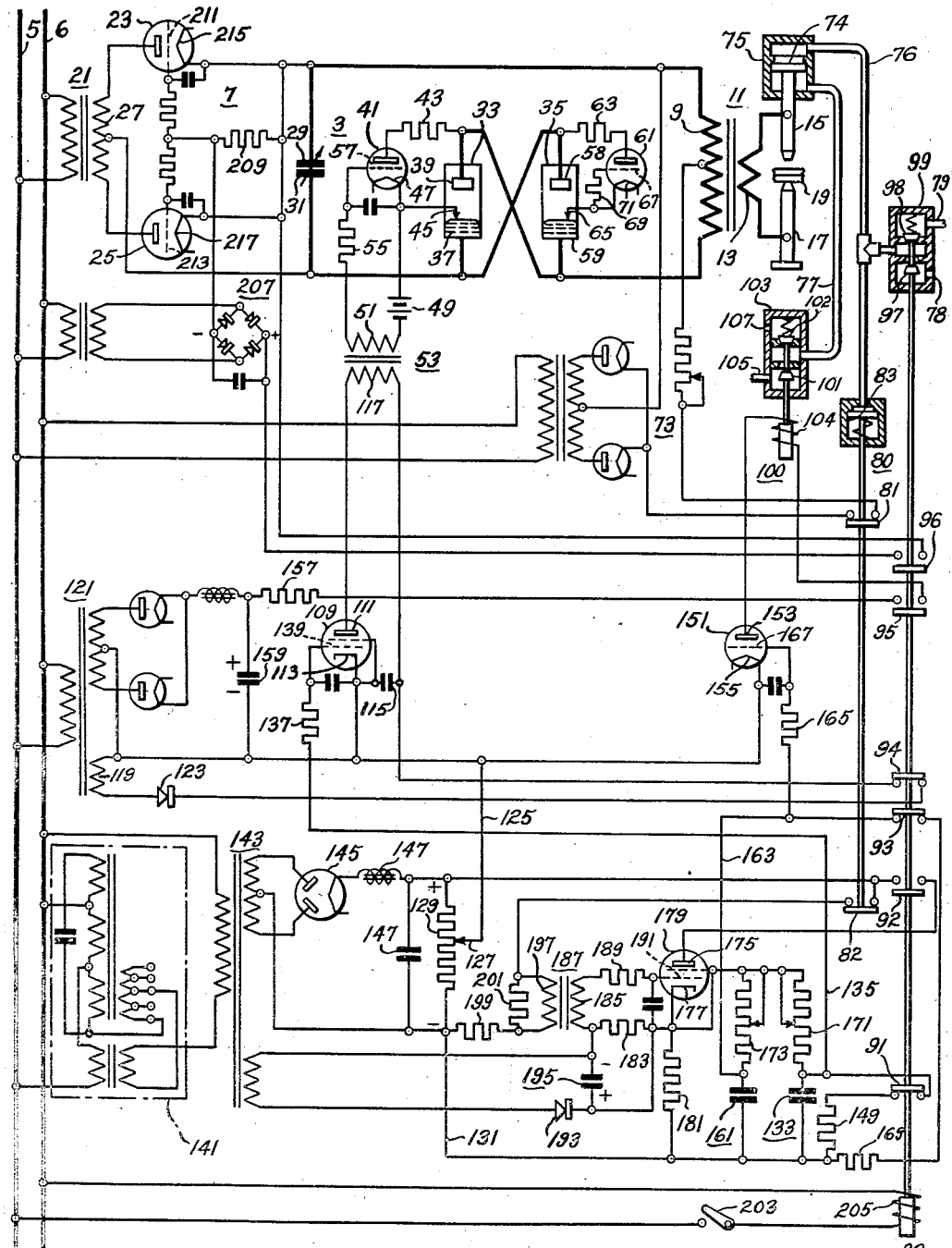
Figure 1 is a circuit diagram illustrating an embodiment of my invention.

A capacitor discharge resistance welding system is shown in Fig. 1. It includes a main adjustable capacitor 3, which may be replaced by a bank of capacitors if desired, connected to be charged from alternating current supply lines 5 and 6 through a charging circuit 7 and to be discharged through the primary winding 9 of a welding transformer 11. The ends of secondary winding 13 of the transformer 11 are connected to different ones of a pair of welding electrodes 15 and 17 which are adapted to be moved relative to each other to clamp the material 19 to be welded therebetween. The advantages and operation of the charging and discharging circuits are described in more detail in the copending application of Hughes and Burgwin, Serial No. 511,575, November 24, 1943, and assigned to the Westinghouse Electric & Manufacturing Company.

The charging circuit 7 receives its energy from an auxiliary transformer 21 connected to lines 5 and 6 and includes a pair of rectifier valves 23 and 25 of the arc-like type, preferably thyratrons. The valves 23 and 25 are connected to form a full wave rectifier between the secondary winding 27 of transformer 21 and the main capacitor 3 whereby direct current is supplied to charge the main capacitor with one plate 29 positive and the other plate 31 negative.

Plate 29 of the main capacitor 3 is connected to one side of the primary winding 9 of the welding transformer 11. The other side of the primary winding 9 is connected to the other plate 31 through a pair of inversely connected ignitrons 33 and 35. The cathode 37 of ignitron 33 is connected to the originally negative plate 31 of the main capacitor 3 and the anode 39 is connected to the originally positive plate 29 through the primary winding 9. Consequently, when ignitron 33 becomes conductive, the capacitor 3 is discharged through the primary winding 9 and ignitron.

An electric discharge valve 41 of the arc-like type, preferably a thyratron, which is hereinafter designated as the first firing valve, is connected in series with a current limiting resistor 43 between the anode 39 and the ignition electrode 45 of the ignitron 33. When the first firing valve 41 is rendered conductive, current starts to flow in the circuit extending from the plate 29 of the main capacitor 3 through the primary winding 9, the resistor 43, first firing valve 41, the ignition electrode 45 and cathode 37 of the ignitron 33 to the other plate 31 of the capacitor. This ignition current renders the ignitron 33 conductive and discharge of the main capacitor 3 is effected.

The control circuit of the first firing valve 41 may be traced from its cathode 47 through a source of biasing potential such as battery 49, the secondary winding 51 of an impulse transformer 53 and a grid resistor 55 to the grid 57 of the first firing valve. The biasing potential supplied from battery 49 normally maintains the first firing valve 41 non-conductive. However, a potential may be impressed through the transformer 53 in a manner described hereinafter to overcome the biasing potential and render the first firing valve conductive.

When the precharged main capacitor 3 is discharged, the discharge current flowing through the inductive primary winding 9 builds up a magnetic field. As the discharge of the main capacitor is completed, the resulting collapse of the magnetic field releases some of the energy stored in the transformer 11 and the secondary winding circuit to cause the main capacitor to be charged inversely with plate 31 positive and plate 29 negative. The anode 58 of ignitron 35 is connected to the plate 31 while the cathode 59 is connected through the primary winding 9 to the plate 29. Consequently, if ignitron 35 is then rendered conductive, the inverse charge on the main capacitor 3 is discharged through the ignitron 35 and the primary winding 9.

Another electric discharge valve 61 of the arc-like type, preferably a thyratron, and hereinafter designated the second firing valve, is connected in series with a current limiting resistor 63 between the anode 58 and the ignition electrode 65 of the ignitron 35. The grid 67 of the second firing valve 61 is connected through a grid resistor 69 to the cathode 71 of the second firing valve. Consequently, when the resultant potential in the circuit consisting of the main capacitor 3, the primary winding 9 and the ignitrons 33 and 35, has the opposite polarity from the original charge on the main capacitor, the firing valve 61 becomes conductive to render the ignitron 35 conductive.

The main capacitor 3 is originally charged through charging circuit 7 to a voltage selected by adjustment of the capacitor to effect welding of the material 19 upon the first discharge of the capacitor through the primary winding 9 and the ignitron 33. Because of the characteristics of the circuit, the subsequent inverse charge on the main capacitor 3 is not of the same magnitude as the original charge but is sufficiently lower that the discharge thereof through the primary winding is not sufficient to effect welding. The discharge of the inverse charge on the capacitor does, however, act to return the flux of the welding transformer a considerable way toward its original state. Moreover, the portion of the inverse charge which is not employed in resetting the flux is again stored in the capacitor 3 with the original polarity so that it is not wasted.

To completely reset the flux, a flux resetting circuit 73 including a full wave rectifier circuit energized from the alternating supply lines 5 and 6 is provided to supply direct current through a portion of the primary winding 9 in a direction opposite to the direction of current flow during the first discharge of the main capacitor 3 so long as a contactor 81 of a back pressure switch 80 is closed. This contactor 81 is held open throughout the welding period.

An air pressure system is associated with one of the welding electrodes 15 which is shown as movable with respect to the other electrode 17. The movable electrode 15 has a piston 74 mounted on the upper end thereof within an air pressure cylinder 75. A pair of air lines 76 and 77 are arranged so that one line 76 supplies air under pressure above the piston 75 tending to lower the electrode 15 and the other line 77 supplies air under pressure below the piston 75 tending to raise the electrode 15. The supply of air to the cylinder 75 through air line 76 is under the control of a valve member 99, the valves 97 and 98 of which are operated by a solenoid 90. Valve 97 controls communication between air line 76 and an exhaust port 78 while valve 98 controls communication between air line 76 and an air supply line 79 which is a source of air under a predetermined pressure. Originally, the air valves 97 and 98 are in the positions illustrated with valve 97 open and valve 98 closed.

The control of the air supply to the cylinder 75 through air line 77 is under the control of another valve member 103, the valves 101 and 102 of which are operated by a solenoid 100. Air valve 101 controls the supply of air from another air line 105 which is a source of air under a predetermined pressure less than the pressure available through air line 79. Air valve 102 controls communication between air line 77 and an exhaust port 107. Originally air valves 101 and 102 are in the position illustrated with valve 101 open and valve 102 closed. Consequently, electrode 15 is originally in the raised position.

In making a weld, air valves 97 and 98 are first operated so that air is supplied through air line 76 to the cylinder 75 above the piston 74 at a pressure greater than the pressure exerted below the piston by air through line 77. As a result the electrode 15 is moved downwardly to clamp the material 19 to be welded between the two electrodes 15 and 17 with a pressure equal to the difference between the pressure through line 76 and line 77. Just before the downward pressure on the material becomes stabilized the spring biased piston 83 in the back pressure switch 80 is moved downwardly by back pressure in air line 76 to open the contactors 81 and 82 carried thereby. The system is now in condition for the welding period in which welding current is supplied through the electrodes and the material therebetween. At a preselected instant during the flow of welding current, the valves 101 and 102 are operated to remove the pressure applied from the supply line 77, and the air below the piston 74 is exhausted through the exhaust port 107. As a result the pressure exerted by the electrodes on the material is rapidly increased by a predetermined amount to effect forging. Upon the conclusion of the weld, the valves 97 and 98 and 101 and 102 are again returned to their original positions to raise the electrode 15 and permit the material 19 to be moved to a new position. It is to be understood that the detailed air pressure system described is merely illustrative of one of several systems which may be used.

A novel timing system is provided in accordance with my invention to render the first firing valve 41 conductive at a particular instant and to energize the solenoid 100 to operate valves 101 and 102 at another particular instant, whereby to effect a weld with a forging operation. The timing system includes a first electric discharge control valve 109 of the arc-like type, preferably a thyratron, having its anode 111 and cathode 113 connected in series with a second capacitor 115 and the primary winding 117 of the auxiliary transformer 53, the secondary winding 51 of which is in the control circuit of the first firing valve 41. The second capacitor 115 is originally connected in a circuit which extends from one side of the secondary winding 119 of another auxiliary transformer 121, energized from the alternating current supply lines 5 and 6, through a dry rectifier 123, a normally closed contactor 94 and the capacitor 115 to the other side of the seecondary winding 119. It is to be noted that charging of both the main capacitor 3 and the second capacitor 115 is begun as soon as the supply lines 5 and 6 are energized.

The control circuit of the first control valve 109 may be traced from the cathode 113 through a conductor 125 to an intermediate tap 127 on a voltage divider 129, another conductor 131, a third capacitor 133, still another conductor 135 and a resistor 137 to the control grid 139 of the valve. The voltage divider 129 has a regulated direct current voltage thereacross which is provided from the alternating current supply lines 5 and 6 through a voltage regulator 141, an auxiliary transformer 143, a full wave rectifier 145 and filtering elements 147. The polarity of the voltage across the voltage divider 129 is such that it tends to maintain the control grid 139 of the first control valve 109 negative with respect to its cathode 113 to maintain the control valve non-conductive. The third capacitor 133 is originally in a discharged state because of the discharge circuit completed thereacross through a normally closed contactor 91 and a resistor 149.

The timing system also includes a second electric discharge control valve 151 of the arc-like type, preferably a thyratron, having its anode 153 and cathode 155 connected in series with the operating coil 104 of the solenoid 100 through a normally open contactor 95 and a resistor 157 across an auxiliary source of direct current potential 159 energized from the alternating current supply lines 5 and 6. The control circuit of the second control valve 151 may be traced from the cathode 155 through the conductor 125 to the intermediate tap 127 on the voltage divider 129, another conductor 131, a fourth capacitor 161, still another conductor 163 and resistor 165 to the control grid 167 of the second control valve. The voltage supplied in the control circuit by the voltage divider 129 tends to maintain the control grid 167 negative with respect to its cathode 155 to maintain the second control valve non-conductive. The fourth capacitor 161 is originally in a discharged state because of the discharge circuit connected thereacross through the normally closed contactor 93 and a resistor 169.

An adjustable resistor 171 is connected in series with the third capacitor 133 and another adjustable resistor 173 is in series with the fourth capacitor 161. These series connected capacitor and resistor arrangements are in parallel circuit relation with the other and in series with the anode 175 and cathode 177 of an electric discharge device 179 of the arc-like type, preferably a thyratron, and a normally originally open contactor 92 across the end terminals of the voltage divider 129. A large stabilizing resistor 181 is also connected in parallel with the series connected capacitors and resistors 161 and 173, 133 and 171.

The control circuit of the discharge device 179 may be traced from its cathode 177 through a resistor 183, the secondary winding 185 of a transformer 187 and a grid resistor 189 to the control grid 191 of the device. A biasing potential appears across the resistor 183 as developed by current supplied from the alternating current supply lines 5 and 6 through the auxiliary transformer 143, a dry rectifier 193 and a capacitor 195 connected in shunt with the resistor 183. This biasing potential tends to make the control grid 191 negative with respect to the cathode 177 and so maintain the discharge device non-conductive.

The primary winding 197 of the transformer 187 is connected in series with a resistor 199 and a normally closed contactor 82 of the back pressure switch 80 across the voltage divider 129. Another resistor 201 is also connected directly in shunt across the primary winding 197. Thus the direct current voltage builds up the magnetic flux in the transformer 187 so that when the contactor 82 is opened the decay of flux in the transformer produces a voltage impulse across the secondary winding 185 of such polarity and magnitude as to overcome the biasing potential and render the discharge device 179 conductive.

To initiate a welding operation, a switch 203 is closed, completing a circuit from the alternating current supply lines 5 and 6 through the operating coil 205 of the solenoid 90. This switch 203 may be closed by hand, to be opened as the weld is completed, or may be closed and opened automatically and periodically by any suitable timing system, such as that disclosed in the copending application of Pearson and Faulk, Serial No. 442,939, filed May 14, 1942 and assigned to the Westinghouse Electric & Manufacturing Company. Such automatic and periodic operation would, of course, result in a series of successive welding operations.

While the solenoid 90 is illustrated as operating the contactors 91, 92, 93, 94, 95 and 96 as well as the valves 97 and 98, it is apparent that separate solenoids may be employed if desired.

When the operating coil 205 is energized, the first contactor 91 opens the discharge circuit across the third capacitor 133; the second contactor 92 closes the anode circuit of the discharge device 179; the third contactor 93 opens the discharge circuit across the fourth capacitor 161; the fourth contactor 94 opens the charging circuit of the second capacitor 115; the fifth contactor 95 completes the anode circuit of the second control valve 151 and the sixth contactor 96 completes a circuit by which a direct current biasing potential is provided from an auxiliary source 207 across a resistor 209 which is connected in circuit between the grids 211 and 213 and cathodes 215 and 217 of the rectifier valves 23 and 25. The application of biasing potential across the resistor 209 serves to prevent the rectifier valves 23 and 25 from becoming conductive and thus halts the flow of charging current through the main capacitor 3.

Energization of the operating coil 205 also operates the valves 97 and 98 in the valve member 99 to apply pressure above the piston 74, moving the electrode 15 downwardly to clamp the material 19 in place. As the material is clamped in place with the desired pressure, the piston 83 of the back pressure switch 80 is moved downwardly. The first contactor 81 of the back pressure switch 80 then opens the flux resetting circuit 73 and the second contactor 82 opens the circuit through the primary winding 197 of the transformer 187. As previously indicated, when the circuit through the primary winding 197 is opened, a voltage impulse is produced across the secondary winding 185 which overcomes the biasing potential and renders the discharge device 179 conductive.

When the discharge device 179 becomes conductive, current flows from the voltage divider 129 through the device 179 and the adjustable resistors 171 and 173 to charge the third and fourth capacitors 133 and 161 at a rate determined by the adjustment of the resistors 171 and 173. The polarity of the charge on the third capacitor 133 is such that when the capacitor charge reaches a predetermined voltage, the biasing potential provided in the control circuit of the first control valve 109 is overcome, causing the control grid 139 to become positive with respect to the cathode 113 to render the control valve 109 conductive. When the first control valve 109 becomes conductive, the second capacitor 115 is discharged through the primary winding 117 of the transformer 53 to supply an impulse in the control circuit of the first firing valve 41 and thereby initiate the flow of welding current as described.

The polarity of the charge across the fourth capacitor 161 is such that when a predetermined voltage is reached across the capacitor, the biasing potential supplied from the voltage divider 129 in the control circuit of the second control valve 151 is overcome, causing the control grid 167 to become positive with respect to the cathode 155 to render the second control valve conductive. When the second control valve becomes conductive, current flows through the valve and the operating coil 104 of the second solenoid 100 to energize it.

It is to be noted that since both the third and fourth capacitors 133 and 161 are charged by current flowing through the single discharge device 179, the charging of the capacitors may be initiated simultaneously. Because of the adjustable resistors 171 and 173 associated with the capacitors 133 and 161, respectively and the use of a regulated direct current voltage source for charging the capacitors, each capacitor may be charged to the voltage necessary to render the associated control valve conductive at an exactly predetermined instant. Moreover by providing separate sources of potential for charging the third and fourth capacitors and for energizing the operating coil of the solenoid 100 and the transformer 53, good regulation of the voltage across the voltage divider 129 may be maintained throughout to provide accurate charging rates.

A typical cycle of operation is shown by the curves of Fig. 2 in which the broken line curve 208 represents the electrode pressure and the full-line curve 210 represents the current through the primary 9 of the welding transformer. Let it be assumed that the switch 203 is closed at the point 211 to energize coil 205 of solenoid 90. After a short time delay the first solenoid 90 is operated and the electrodes 15 and 17 are closed at the point 213. Electrode pressure builds up gradually along line 215 to the desired welding pressure at 217. Just before the full welding pressure is reached, the back pressure switch 80 is operated as at point 219 to initiate charging of the third and fourth capacitors 133 and 161. The fourth capacitor 161 may be charged sufficiently to render the second control valve 151 conductive at the point 221. This control valve 151 energizes the operating coil 104 of the second solenoid 100 which does not effect opening of the valves 101 and 102 until a predetermined time later. At the point 223 the third capacitor 133 is charged sufficiently to render the first control valve 109 conductive to initiate the flow of welding current as illustrated by curve 210. It is to be noted that the first portion of curve 210 which is above the base line represents the initial discharge of the main capacitor 3 and the second portion below the base line represents the discharge of the inverse charge on the capacitor.

At the point 227 the solenoid 100 which was energized at point 221 operates valves 101 and 102 so that the electrode pressure increases rapidly along line 229 to the desired forging pressure level at 231. Current through the welding transformer ceases at the point 233 and the switch 203 may be opened shortly thereafter as at point 234. Opening of switch 203 deenergizes coil 205 of solenoid 90 so that valves 97 and 98 are opened at point 235 to remove the air pressure above the piston 74. Deenergization of coil 205 of solenoid 90 also causes contactors 91 and 93 to close the discharge circuits across capacitors 133 and 161, contactor 92 to open the anode circuit of discharge device 179, contactor 94 to close the charging circuit for the second capacitor 115, contactor 95 to open the circuit through coil 104 of solenoid 100, and contactor 96 to open the blocking potential circuit permitting recharging of the main capacitor. Deenergization of coil 104 of the solenoid 100 causes pressure to be applied through valve 101 below the piston 74 to raise the electrode 15 at point 237.

The time from point 219 to point 223 is determined by the rate of charging of the third capacitor 133. The time from point 219 to point 227 is made up of the adjustable time from point 219 to point 221, determined by the charging rate of the fourth capacitor 161, and the constant valve operating or delay time from point 221 to point 227. Thus, the position of point 227 with respect to the current curve 210 may be accurately adjusted over a wide range by means of resistors 171 and 173.

As previously indicated the entire welding operation may be repeated by reclosing switch 203 after capacitors 3 and 115 are recharged.

Although I have shown and described a preferred embodiment of my invention, I am aware that many modifications thereof are possible within the spirit of the invention. I do not intend therefore to limit my invention to the specific embodiment disclosed.

I claim as my invention:

1. For use with a resistance welding machine having a transformer with a primary and a secondary winding, the terminals of the secondary winding being individually connected to different ones of a pair of welding electrodes with which a fluid pressure system is associated for effecting relative movement of the electrodes to clamp material to be welded therebetween with a predetermined pressure and including a solenoid valve operable to increase the pressure by a predetermined amount, the combination comprising power supply means including first, normally non-conductive, electric valve means, adapted to be operable to supply a pulse of current through said primary winding when said first electric valve means is rendered conductive, first circuit means including a second normally non-conductive electric valve, adapted to energize said solenoid valve when said second electric valve is rendered conductive, an electric discharge device, a pair of capacitors connected in parallel circuit relation with respect to each other and in series with said discharge device, second circuit means adapted to impress a voltage across said series connected discharge device and paralleled capacitors, means for rendering said discharge device conductive to initiate charging of said capacitors simultaneously, first control means responsive to a first predetermined voltage on one of said capacitors for rendering said first electric valve means conductive, and second control means responsive to a second predetermined voltage on the other capacitor for rendering said second electric valve conductive.

2. A resistance welder comprising a pair of welding electrodes, a transformer having a primary and a secondary winding with the terminals of the secondary winding individually connected to different ones of said welding electrodes, a fluid pressure system associated with said electrodes for effecting relative movement thereof to clamp the material to be welded therebetween with a predetermined pressure, a solenoid valve in said fluid system operable to increase the pressure exerted on the material by a predetermined amount, power supply means including first normally non-conductive electric valve means, adapted to be operable to supply a pulse of current through said primary winding when said first electric valve means is rendered conductive, first circuit means including a second normally non-conductive electric valve, adapted to energize said solenoid valve when said second electric valve is rendered conductive, an electric discharge device, a pair of capacitors connected in parallel circuit relation with each other and in series with said discharge device, second circuit means adapted to impress a voltage across said series connected discharge device and paralleled capacitors, means for rendering said discharge device conductive to initiate charging of said capacitors simultaneously, first control means responsive to a first predetermined voltage on one of said capacitors for rendering said first electric valve means conductive, and second control means responsive to a second predetermined voltage on the other capacitor for rendering said second electric valve conductive.

3. For use with resistance welding machine having a transformer with a primary and a secondary winding, the terminals of the secondary winding being individually connected to different ones of a pair of welding electrodes with which a fluid pressure system is associated for effecting relative movement of the electrodes to clamp the material to be welded therebetween with a predetermined pressure and including a solenoid valve operable to increase the pressure by a predetermined amount, the combination comprising power supply means including first normally non-conductive electric valve means of the arc-like type, adapted to be operable to supply a pulse of current through said primary winding when said first electric valve means is rendered conductive, first circuit means including a second normally non-conductive electric valve of the arc-like type, adapted to energize said solenoid valve when said second electric valve is rendered conductive, an electric discharge device of the arc-like type, a pair of capacitors, an adjustable resistor in series with each of said capacitors, each series connected capacitor and resistor being connected in parallel circuit relation with the other and in series with said discharge device, second circuit means adapted to impress a voltage across said series connected discharge device and paralleled capacitors and resistors, means for rendering said discharge device conductive to initiate charging of said capacitors simultaneously, the rate of charging of each of said capacitors being determinable by the adjustment of the corresponding resistor, first control means responsive to a first predetermined voltage on one of said capacitors for rendering said first electric valve means conductive, and second control means responsive to a second predetermined voltage on the other capacitor for rendering said second electric valve conductive.

HARRY J. BICHSEL.

REFERENCES CITED

The following references are of record in the file of this patent:

UNITED STATES PATENTS

| Number | Name | Date |
| --- | --- | --- |
| 2,327,268 | Jenks | Aug. 17, 1943 |